May 31, 1966      A. G. HAYDU      3,253,682
BRAKE HEAD POSITIONING DEVICE
Filed April 22, 1964
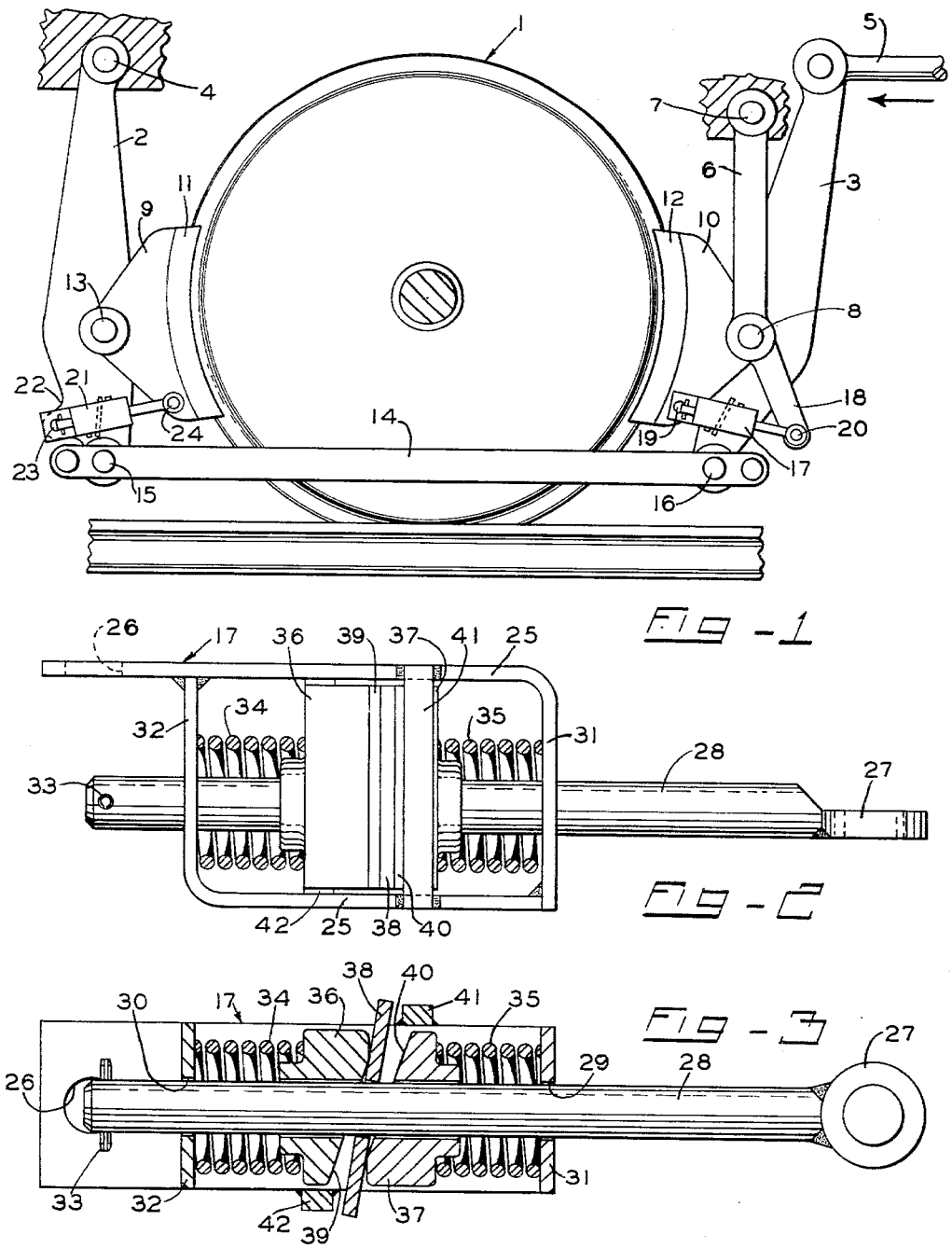
INVENTOR.
ANDREW G. HAYDU
BY
*A. A. Steinmiller*
ATTORNEY Patented May 31, 1966

3,253,682
BRAKE HEAD POSITIONING DEVICE
Andrew G. Haydu, Pittsburgh, Pa., assignor to Westinghouse Air Brake Company, Wilmerding, Pa., a corporation of Pennsylvania
Filed Apr. 22, 1964, Ser. No. 361,810
5 Claims. (Cl. 188—199)

This invention relates to brake head positioning devices, and more particularly to means for automatically adjusting a brake head on a brake hanger with a positive locking action in a manner that the brake head and attached brake shoe will always be maintained substantially concentrically positioned relative to the vehicle wheel while the brake hanger and the brake head are in a release or application position.

In most present-day railway brake equipment, the brake hanger is pivotally suspended from the side frame of the car truck so as to hang downwardly adjacent to the tread of a wheel to be braked. At a position vertically below the level of the axis of the wheel, a brake head and attached brake shoe are pivotally attached to the brake hanger in a manner that the brake shoe may be swung into braking engagement with the tread surface of the wheel. Due to the pivotal mounting of the brake head on the hanger, vibration and gravitational forces acting on the brake head and shoe will cause the head and shoe to move about its pivot mounting in a manner that the shoe is vertical and not concentric with the wheel with the result that the top of the shoe may drag on or engage the tread of the wheel even when the brakes are supposed to be in a release position. This dragging of the shoe during brake release produces the harmful condition of heating of the wheel rim. Moreover, when a brake application is made with the brake shoe hanging in this vertical position as just described, the top of the shoe is first to engage the tread of the wheel with the result that much more wear occurs on the top portion of the shoe thereby reducing the effective braking surface of the shoe and the service life of the shoe.

There have been several types of devices utilized to prevent this described tilting of the brake head, such as pressure plates at the pivot point of the brake head or spring devices to keep the lower portion of the brake head spring biased toward the tread surface of the wheel. A good example of one of these devices is the apparatus disclosed in U.S. Patent 2,130,595, of E. G. Mueller, issued September 20, 1938, in which a brake head balancing device is disclosed utilizing a resilient member to press against a slidable sleeve to provide enough friction thereby to maintain the sleeve in a position whereby the brake head is balanced. The balance of the brake head is therefore dependent on the friction force of the resilient member being sufficient to maintain the sleeve positioned, and yet being free enough that free sliding, smooth adjusting of the sleeve is possible with increased shoe wear and slack adjustment of the brake rigging.

It is an object of the present invention to provide a brake head positioning device which is not dependent on sliding friction adjusting means, but which effects a positive unlocking and locking adjustment with each application of the vehicle brakes.

According to the present invention, there is provided a brake head positioning device suitably attached to the brake hanger and the brake head for automatic repetitive adjustment thereof to maintain the brake head positioned about its supporting pivot point on the brake hanger by utilizing a latch cleat arrangement on a stem in a sequence of operations including a positive unlocking, a positive adjustment, and a positive relocking in the adjusted position in a manner that the brake shoe cannot be tipped or tilted by vibration or gravity forces, but sufficiently and uniformly clears the tread of the wheel to be braked during brake release, and engages the wheel tread in substantial concentricity thereto at substantially its entire braking surface during a brake application.

In the accompanying drawing:

FIG. 1 is an elevational view of a brake rigging structure embodying two of the present novel brake head positioning devices mounted in two different manners to position the front and rear brake heads respectively about a vehicle wheel;

FIG. 2 is a plan view of the brake head positioning device, and

FIG. 3 is a sectionalized view of the brake head positioner as seen from the side of the vehicle to illustrate the positive locking of the adjusting means.

*Description*

Referring to FIG. 1, the typical brake rigging for the vehicle wheel 1 includes two similar brake hanger levers 2 and 3. Hanger lever 2 is pivotally secured to the car truck frame or suitable structure by a pivot pin 4, and hanger lever 3 is secured to a brake applying lever or rod 5 which is actuated to the left, as shown by the arrow in the drawing (by means well known and not shown herein), to apply the brakes. A brake hanger 6 is pivotally secured to the car truck frame by a pivot pin 7 and to the hanger lever 3 by a pivot pin 8. Similar brake heads 9 and 10, having shoes 11 and 12, respectively, are secured to the hanger levers 2 and 3 by pivot pins 13 and 8, respectively. A tie rod 14 connects the lower ends of the brake hanger levers 2 and 3 in a pivotal manner by use of pins 15 and 16, respectively, so that simultaneous movement of both brake heads in opposite directions in a linking manner well known in the art and not described herein is effected.

A positioner device 17 is pivotally secured between an extension arm 18 on the hanger 6 and the brake head 10 by pivot pins 19 and 20, for positioning the brake shoe 12, in a manner hereinafter described.

A positioner device 21 is pivotally secured between an extended lug 22 on the hanger lever 2 and the brake head 9 by pivot pins 23 and 24, for positioning the brake shoe 11, in a manner hereinafter described.

In that the positioner devices 17 and 21 are identical, description of only the positioner device 17 is provided as follows:

As shown in FIG. 2 and FIG. 3, the positioner device 17 comprises a frame piece 25 adapted to be secured at one end to the brake head 10 by the pin 19 (FIG. 1) passing through a drilled hole 26, and the other end of the positioner is secured to the extension arm 18 by the pin 20 (FIG. 1) passing through a drilled eye lug 27 in the end of a positioning stem 28. The positioning stem 28 and eye lug 27 are made of a single piece of hardened steel with suitable reinforcing welds to prevent any bending or breaking.

The positioning stem 28 extends slidably through a pair of drilled holes 29 and 30 in the ends 31 and 32, respectively, of the frame piece 25 and is maintained therein by a pin 33 inserted through the stem 28 at the end opposite that having the eye lug 27. Sliding movement of the stem 28 is limited in one direction by the eye lug 27 engaging the frame end 31 and is limited in the opposite direction by the pin 33 engaging the frame end 32; however, these limits would very rarely be reached under normal conditions, as will be seen in the operational description following hereinafter. Within the confines of the frame ends 31 and 32, the stem 28 passes coaxially through a pair of opposingly biased coil springs 34 and 35, a pair of latch supports 36 and 37, and a latch cleat 38. The coil springs 34 and 35 abut the frame ends 32 and 31, respectively, on one of their ends, and a latch support 36 and 37 (press-fitted) in their opposite ends, respectively, and biased towards each other by the spring forces with a latch cleat 38 interposed between them about the stem 28. The faces 39 and 40 of the respective latch supports 36 and 37 are slanted away from the vertical plane in opposite directions in a manner that only the lower portion of the face 40 and the upper portion of the face 39 engage the respective lower and upper portions of the latch cleat 38 interposed between them to thereby cause the cleat 38 to tilt or cock respective to the vertical plane and thereby crampingly or bindingly engage the stem 38 in a positive locking, non-slidable manner while so tilted. A pair of stops 41 and 42 are suitably positioned adjacent to, but not touching, the latch cleat 38 and fastened, as by welding, across the sides of the frame piece 25 on the top and bottom, respectively, in a manner such that the latch cleat 38 will engage the stop 41 on the top upon sufficient movement of the stem 28 in one direction (to the left) relative to the frame 25 and engage the stop 42 on the bottom upon sufficient movement of the stem 28 in the opposite direction (to the right) relative to the frame 25, to thereby remove the tilt therefrom and thus remove the positive locking action to allow the stem to slide freely therethrough to reposition the latch cleat on the stem 28, in a manner described hereinafter.

*Operation*

In operation, the brake applying lever 5 is moved to the left (as shown by the arrow in FIG. 1), which causes the pivot pin 8 and thereby the connected brake hanger 6 to pivot clockwise (as shown in the drawing) about the pivot pin 7 to move the brake head 10 and attached shoe 12 toward a braking engagement with the rim of the wheel 1. Simultaneously, the counterclockwise pivoting action of the lower portion of the hanger lever 3 about the pivot pin 8 causes the pin 16 to move the brake rod 14 to the right (as shown in FIG. 1) to, in turn, cause the hanger lever 2 to pivot counterclockwise about the pivot pin 4 to move the brake head 9 and shoe 11 toward a braking engagement with the rim of the wheel 1. As the shoes 11 and 12 are initially brought into contact with the rim of the wheel 1, either one or both of them may be tilted about the respective pivot pins 13 and 8 such that the point of engagement will be either the top or the bottom of the shoe to tend to cause uneven wear of the shoes. With the present apparatus, this is prevented as follows:

Assume that shoe 12 engages the wheel rim at the top portion first. After initial engagement at the top, continued brake-applying movement of the shoe 12 will cause the shoe 12 and brake head 10 to pivot clockwise about the pin 8, causing the bottom portion of the brake head 10 and shoe 12 to move to the left to bring the entire surface of shoe 12 into contact with the wheel rim. The just-described movement to the left of the bottom portion of the brake head 10 causes the frame piece 25 of the positioner device to also move to the left to slightly compress the spring 35 and cause the slanted face 40 of the latch support 37 to bear against the latch cleat 38 to maintain the latch cleat angled and thereby bindingly engaged in a positive locking manner to the stem 28. With continued movement of the frame piece 25 to the left a very small distance, the stop 41 will engage the latch cleat 38 and tend to position the latch cleat perpendicular to the axis of stem 28 to thereby unlock the positive binding engagement therebetween and permit the latch cleat 38 and the entire positioning device to move freely to the left along the stem 28 to reposition the latch cleat on the stem 28 at a position wherein the shoe 12 is concentric with the wheel rim. When the stop 41 engages the latch cleat 38 and removes the tilt therefrom, as just described, the latch cleat will put both the springs 34 and 35 under a slight degree of compression, in which condition they are maintained while the brakes are applied. When the brakes are released, the springs 34 and 35 are permitted to expand a very slight amount to move the stop 41 away from the latch cleat and permit the angled faces of the latch supports 36 and 37 to again tilt the latch cleat 38 a sufficient degree to bind on the stem 28 and positively lock in the new position to maintain the uniform clearance between the entire length of the brake shoe and the wheel rim while the brakes are released, thereby assuring a uniform contact of the brake shoe on the next brake application.

It can be seen that the positioning device will operate to adjust and maintain the brake shoe concentrically positioned relative to the wheel rim every time a brake application is made to compensate for any possible slack action or misadjustment in the brake rigging.

If the initial contact of the shoe against the wheel rim is at the bottom portion of the shoe, the positioner device 17 operates in a similar manner to that described heretofore. Continued applying movement of the brake shoe 12 will cause counterclockwise pivoting of the brake head 10 about the pin 8 to thereby move the frame piece 25 of the positioner device 17 to the right against the force of spring 34 until the stop 42 engages the latch cleat 38 and shifts it toward perpendicular relation to the stem to, in turn, free the positive locking engagement thereof on the stem 28. With the latch cleat 38 unlocked, the entire positioner device assembly will move freely to the right relative to the stem 28 to a new position on the stem 28, in which the brake head 10 will maintain the braking surface of the shoe 12 concentric with the wheel tread. When the brakes are released, the latch cleat 38 is permitted to tilt and positively lock on the stem 28, as explained before, and thereby maintain the positioner device in its new position on the stem 28 to maintain the clearance between the shoe and the wheel rim uniform.

The positioner device 21 is mounted between the brake head 9 and a lug 22 on the hanger lever 2, in a manner different than that described for the positioner device 17, merely to show an alternate mounting. As can be seen in FIG. 1 of the drawing, the stem of the positioner device 21 is secured to the brake head 9, and the frame piece is secured to the hanger lever 2 thereby illustrating a mounting reversed from that of the positioner device 17 previously described. The operation of the positioner device 21 is not changed from that of positioner device 17 with this alternate mounting.

Having now described the invention, what I claim as new and desire to secure by Letters Patent, is:

1. In a vehicle brake apparatus of the type having a brake head and shoe assembly pivotally carried by a brake hanger lever for movement into braking engagement with a vehicle wheel tread, a brake head positioning device comprising:
 (a) a frame member having two end walls in fixed spaced relation and provided with registering openings therethrough,
 (b) a stem extending through said openings in said end walls for slidable movement therethrough in either direction with respect to said frame member,
 (c) said frame member and said stem having an operative connection between the brake hanger lever and the brake head in a manner such that axial movement of the stem in one direction or the opposite direction relative to the frame member occurs responsively to relative pivotal movement of the hanger lever and the brake head incident to a brake application, and
 (d) locking means for locking said stem to said frame member, said locking means being operative responsively to application of braking forces to the hanger lever to release said stem to permit axial movement in one direction or the opposite direction thereof relative to the frame member and responsively to release of brake forces on the hanger lever to positively lock the stem with respect to the frame member to prevent axial movement thereof relative to the frame member.

2. A brake head positioning device, as claimed in claim 1, further characterized in that said locking means includes:
 (a) a latch cleat mounted on said stem and slidably moved thereon to a position corresponding to concentricity between the brake head and the vehicle wheel tread during a brake application, and
 (b) spring means encircling said stem and interposed between said frame member and said latch cleat in a manner to tilt said latch cleat at an angle to said stem to positively lock said latch cleat on said stem upon a brake release operation.

3. A brake head positioning device, as claimed in claim 2, further characterized by including:
 (a) a latch cleat releasing means secured to said frame member and moved into engagement with said latch cleat upon a brake application to reduce the angle of tilt of the latch cleat with respect to the said stem in opposition to the biasing forces of said spring means in a manner to positively unlock said latch cleat from said stem incident to a brake application.

4. In a brake equipment for braking a wheel of a railway car truck, the combination of:
 (a) a brake hanger lever pivotally suspended adjacent its upper end to the car truck, the other end being free to move about said pivotally secured end,
 (b) a brake head pivotally secured to said brake hanger lever between the upper and lower ends thereof,
 (c) a brake shoe carried by said brake head for concentric engagement with the tread of a wheel of the car truck during a brake application, and
 (d) a positioning device secured between the said brake head and the lower end of said brake hanger lever operatively adjusted in length to correspond to concentricity of the brake shoe and the wheel tread upon a brake application, said positioning device comprising:
  (i) a frame member having two end walls in fixed spaced relation and provided with registering openings therethrough,
  (ii) a stem extending through said openings in said end walls for slidable movement therethrough in either direction with respect to said frame member,
  (iii) said frame member and said stem being operatively connected between the brake hanger lever and the brake head in a manner such that axial movement in one direction or the opposite direction of the stem relative to the frame member occurs responsively to relative pivotal movement of the hanger lever and the brake head incident to a brake application, and
  (iv) locking means for locking said stem to said frame member, said locking means being operative responsively to application of braking forces to the hanger lever to release said stem to permit axial movement in one direction or the opposite direction thereof relative to the frame member and responsively to release of braking forces on the hanger lever to positively lock the stem with respect to the frame member to prevent axial movement thereof relative to the frame member.

5. A brake head positioning apparatus for automatically positioning a brake head on a brake hanger lever such that a brake shoe carried by the brake head is positioned substantially concentric to the tread of a wheel of a vehicle to be braked, said apparatus comprising, in combination:
 (a) a frame member secured to the brake head and having two end walls in fixed spaced relation provided with registering openings therethrough,
 (b) a stem secured to the brake hanger lever and extending through said openings in said end walls for slidable movement therethrough in either direction with respect to said frame member,
 (c) a pair of coaxially opposing spring devices encircling said stem within the confines of said framing member,
 (d) a latch cleat slidably mounted on said stem means interposed between said pair of opposing spring devices,
 (e) a pair of latch shoulder means each having angled faces, one of said latch shoulder means being interposed between one side of said latch cleat and one of said opposing spring devices, the other of said latch shoulder means being interposed between the other side of said latch cleat and the other of said opposing spring devices whereby said angled faces cause said latch cleat to be cocked at an angle to said stem to positively lock said cleat in position on the stem during a brake release operation, and
 (f) unlocking means secured to said framing member adjacent said latch cleat and operable responsively to a brake application to engage and unlock said latch cleat from said stem and reposition said latch cleat on said stem at a position where said brake shoe is concentrically positioned relative to the wheel.

References Cited by the Examiner

UNITED STATES PATENTS 2,244,084  6/1941  Saenger.
2,291,662  8/1942  Thibeault.
2,951,560  9/1960  Smellie _____ 188—196 X

FOREIGN PATENTS 59,283  8/1925  Sweden.

MILTON BUCHLER, *Primary Examiner.*

DUANE A. REGER, *Examiner.*